(12) United States Patent
Xu

(10) Patent No.: US 9,030,631 B2
(45) Date of Patent: May 12, 2015

(54) LIQUID CRYSTAL DISPLAYING PANEL AND MANUFACTURING METHOD THEREOF

(71) Applicant: Shenzhen China Star Optoelectronics Technology Co., Ltd., Shenzhen, Guangdong (CN)

(72) Inventor: Liang Xu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 206 days.

(21) Appl. No.: 13/813,430

(22) PCT Filed: Dec. 14, 2012

(86) PCT No.: PCT/CN2012/086656
§ 371 (c)(1),
(2) Date: Jan. 31, 2013

(87) PCT Pub. No.: WO2014/079118
PCT Pub. Date: May 30, 2014

(65) Prior Publication Data
US 2014/0139798 A1    May 22, 2014

(30) Foreign Application Priority Data
Nov. 20, 2012   (CN) .......................... 2012 1 0472372

(51) Int. Cl.
 G02F 1/1333    (2006.01)
 G02F 1/1339    (2006.01)
 G02F 1/1335    (2006.01)
(52) U.S. Cl.
 CPC ........ *G02F 1/1339* (2013.01); *G02F 1/133512* (2013.01)
(58) Field of Classification Search
 CPC .......................... G02F 1/133512; G02F 1/1339

USPC ......................................... 349/110, 153, 190
See application file for complete search history.

(56) References Cited

U.S. PATENT DOCUMENTS

| | | | | |
|---|---|---|---|---|
| 5,946,070 A * | 8/1999 | Kohama et al. | ................ | 349/156 |
| 6,373,547 B2 * | 4/2002 | Saito et al. | .................... | 349/155 |
| 2004/0165127 A1 * | 8/2004 | Lin et al. | ........................ | 349/110 |

FOREIGN PATENT DOCUMENTS

| | | |
|---|---|---|
| CN | 101430459 | 5/2009 |
| CN | 101435957 | 5/2009 |
| CN | 102132201 | 7/2011 |
| JP | 2002072187 A | 3/2002 |
| JP | 2003222887 | 8/2003 |

OTHER PUBLICATIONS

International Search Report issued for PCT application No. PCT/CN2012/086656 by the State Intellectual Property Office of China.
1st Office Action of counterpart Chinese Patent Application No. 201210472372.5 issued on Aug. 29, 2014.

* cited by examiner

Primary Examiner — Thanh-Nhan P Nguyen

(57) ABSTRACT

The present disclosure provides a liquid crystal displaying panel, which includes a first substrate having a displaying area and a sealant-coating area surrounding the displaying area and a light-blocking layer arranged between the displaying area and the sealant-coating area. The light-blocking layer can absorb and block ultraviolet light to prevent the ultraviolet light from affecting the liquid crystal layer. Additionally, the light-blocking layer and the pixel electrode layer are formed in the same process, that is, the light-blocking layer is simultaneously formed when the pixel electrode layer is formed. A thickness of the light-blocking layer is equal to that of the pixel electrode layer. Since the thickness of the light-blocking layer is equal to that of the pixel electrode layer, the pixel electrode layer and the light-blocking layer can be formed in the same process, which simplifies the manufacturing process of the light-blocking layer and the needed equipment.

15 Claims, 4 Drawing Sheets

LIQUID CRYSTAL DISPLAYING PANEL AND MANUFACTURING METHOD THEREOF

BACKGROUND

1. Technical Field

The present disclosure relates to liquid crystal displaying technologies, and particularly, to a liquid crystal displaying panel, a manufacturing method of the liquid crystal displaying panel, and a manufacturing method of a light-blocking layer.

2. Description of Related Art

With the development of electronic technologies and information society, demands for display devices are gradually increased. Liquid crystal displaying panel is thin and small, which makes it gradually replace the traditional code-cathode display device and become the mainstream of the display devices.

The liquid crystal displaying panel includes two substrates and a liquid crystal layer sealed between the two substrates. In the manufacture of the liquid crystal displaying panel, liquid crystals are injected into the space between the two substrates and are sealed therein by a sealant. The sealant then is cured to form the liquid crystal displaying panel.

Generally, the sealant is cured by an ultraviolet (UV) light device. The UV light device includes a number of UV light lamps located above the liquid crystal displaying panel for emitting ultraviolet light to cure the sealant of the liquid crystal displaying panel.

In a PSVA (Polymer Stabilized Vertical Alignment) type of liquid crystal display, a number of reactive monomers are mixed in the liquid crystal layer between the two substrates, and a polyimide layer is coated on the surface of each substrate to be the alignment material. When applying voltage to the substrates and irradiating the substrates with ultraviolet light, phase separation occurs between the reactive monomers and liquid crystal molecules to create polymers on the alignment material of the substrates. Due to the interactions between the polymers and the liquid crystal molecules, the liquid crystal molecules can be arranged along the direction of the polymer molecules, thus, the liquid crystal molecules can have pre-tilt angles.

Since the reactive monomers mixed with the liquid crystals of the PSVA type of liquid crystal display are caused to react after being irradiated by ultraviolet light, when the sealant of the PSVA type of liquid crystal display is cured, a photomask is used for covering the area corresponding to the liquid crystals. However, due to the refraction of the light occurred at the edge of the photomask, a part of ultraviolet light may be diffracted and irradiate the area corresponding to the liquid crystals, in this situation, the reactive monomers may react quickly to cause defect of the liquid crystal displaying panel.

SUMMARY

The present disclosure provides a liquid crystal displaying panel and a manufacturing method thereof, which can avoid the pre-reaction of reactive monomers when the reactive monomers are pre-irradiated by ultraviolet light in the curing process of the liquid crystal displaying panel and further avoid the defect of the liquid crystal displaying panel caused thereby.

The liquid crystal displaying panel provided in the present disclosure includes: a first substrate having a displaying area and a sealant-coating area surrounding the displaying area; and a light-blocking layer arranged between the displaying area and the sealant-coating area.

Preferably, the first substrate further includes a pixel electrode layer having a thickness equal to that of the light-blocking layer.

Preferably, an outer edge of the light-blocking layer is aligned with an inner edge of the sealant-coating area of the first substrate, and an inner edge of the light-blocking layer is kept close to the pixel electrode layer without contacting the pixel electrode layer.

Preferably, the light-blocking layer generates no electrical signals.

Preferably, the liquid crystal displaying panel further includes a second substrate, the second substrate includes a common electrode layer electrically connected to the light-blocking layer.

Preferably, a fan-shaped notch is formed at an inner side of each corner of the light-blocking layer.

Preferably, a number of openings are formed in the light-blocking layer.

Preferably, the light-blocking layer is made of indium tin oxide.

The manufacturing method of a liquid crystal displaying panel provided in the present disclosure includes: providing a first substrate which includes a displaying area and a sealant-coating area surrounding the displaying area; and forming a light-blocking layer between the displaying area and the sealant-coating area.

Preferably, the step of forming a light-blocking layer between the displaying area and the sealant-coating area includes: depositing a metal layer on the first substrate; and etching the metal layer to form a pixel electrode layer on the displaying area of the first substrate and the light-blocking layer surrounding the pixel electrode layer.

Preferably, an outer edge of the light-blocking layer is aligned with an inner edge of the sealant-coating area of the first substrate, and an inner edge of the light-blocking layer is kept close to the pixel electrode layer without contacting the pixel electrode layer.

Preferably, the manufacturing method further includes the following step before the step of forming a light-blocking layer between the displaying area and the sealant-coating area: forming a pixel electrode layer on the displaying area of the first substrate.

Preferably, the light-blocking layer is made of indium tin oxide.

Preferably, the light-blocking layer generates no electrical signals.

Preferably, the manufacturing method further including: providing a second substrate which includes common electrode layer electrically connected to the light-blocking layer.

Preferably, the manufacturing method further includes: forming a fan-shaped notch at an inner side of each corner of the light-blocking layer.

Preferably, the manufacturing method further includes: forming a number of openings in the light-blocking layer.

The light-blocking layer of the embodiment can absorb and block ultraviolet light to prevent the ultraviolet light from affecting the liquid crystal layer and causing displaying defect of the liquid crystal displaying panel. Additionally, the light-blocking layer and the pixel electrode layer are formed in the same process, that is, the light-blocking layer is simultaneously formed when the pixel electrode layer is formed. A thickness of the light-blocking layer is equal to that of the pixel electrode layer. Since the thickness of the light-blocking layer is equal to that of the pixel electrode layer, the pixel electrode layer and the light-blocking layer can be formed in the same process, which simplifies the manufacturing process of the light-blocking layer and the needed equipment.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
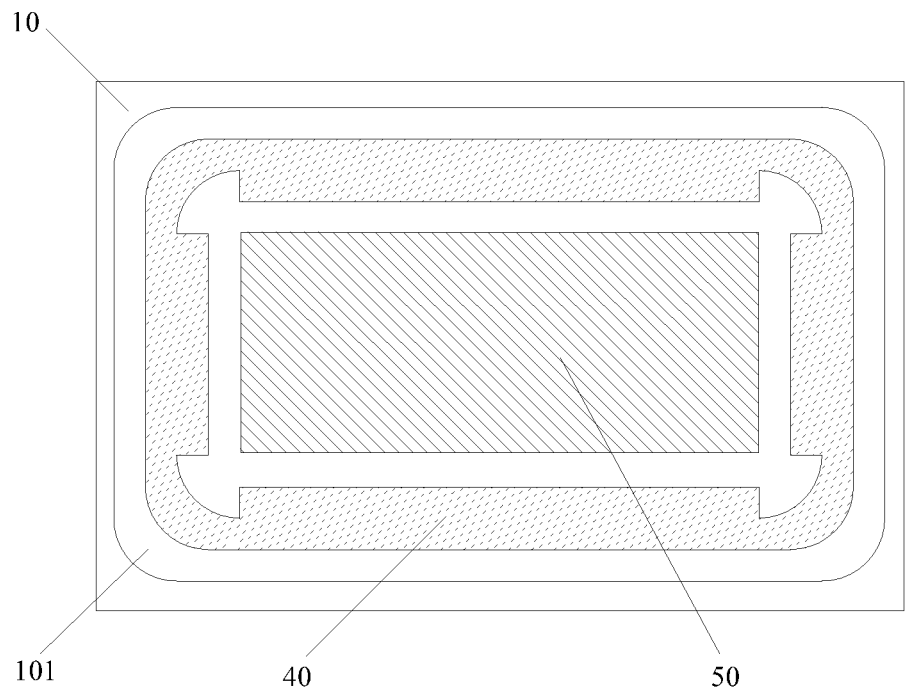
FIG. 1 is a schematic view of a first substrate of a liquid crystal displaying panel in accordance with a first embodiment of the present disclosure.
Figure 2:
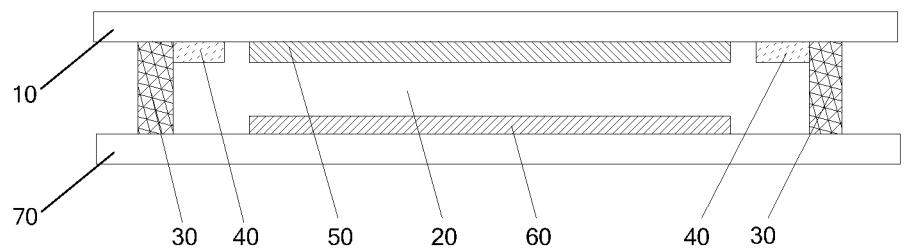
FIG. 2 is a cross-section of the liquid crystal displaying panel with the first substrate of FIG. 1.

Referring to FIGS. 1 and 2, in which FIG. 1 is a schematic view of a first substrate of a liquid crystal displaying panel in accordance with a first embodiment of the present disclosure, and FIG. 2 is a cross-section of the liquid crystal displaying panel with the first substrate of FIG. 1.

In the embodiment, the liquid crystal displaying panel includes a first substrate 10, a liquid crystal layer 20, and a second substrate 70. The first substrate 10 and the second substrate 70 are opposite to each other, and the liquid crystal layer 20 is arranged between the first substrate 10 and the second substrate 70. The liquid crystal layer 20 includes liquid crystal molecules and monomers mixed with the liquid crystal molecules. The first substrate 10 includes a displaying area with a pixel electrode layer 50 covered thereon. The second substrate 70 also includes a displaying area with a common electrode layer 60 covered thereon. Two sealant-coating areas 101 respectively surround the pixel electrode layer 50 of the first substrate 10 and the common electrode layer 60 of the second substrate 70. A sealant 30 is respectively coated on the sealant-coating areas 101 of the first substrate 10 and the second substrate 70 for sealing the liquid crystal layer 20 between the two substrates. A light-blocking layer 40 is formed between the pixel electrode layer 50 and the sealant-coating area 101 of the first substrate 10. The light-blocking layer 40 is used for protecting the reactive monomers from being irradiated by ultraviolet light and thereby avoiding the pre-reaction of the reactive monomers when the sealant 30 is cured by the ultraviolet light.

Figure 3:
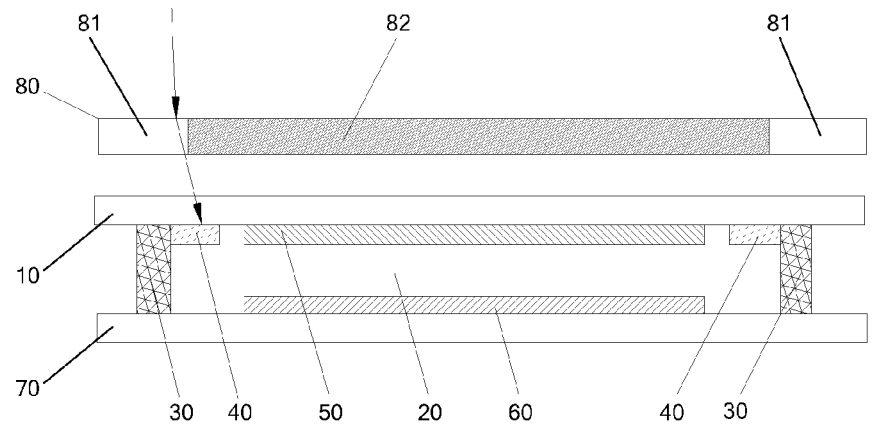
FIG. 3 is a schematic view showing how a light-blocking layer of the liquid crystal displaying panel blocks light in a UV curing process.

Referring to FIG. 3, which is a schematic view showing how a light-blocking layer of the liquid crystal displaying panel blocks light in a UV curing process. In the technique of curing the sealant 30, a photomask 80 is arranged above the liquid crystal displaying panel. The photomask 80 includes transparent areas 81 corresponding to the sealant-coating area 101 and a light-blocking area 82 corresponding to the liquid crystal layer 20 of the liquid crystal displaying panel. After emitting from an ultraviolet light source (not shown), the ultraviolet light (as the arrow shown in FIG. 3) passes through the transparent areas 81 of the photomask 80 to irradiate the sealant 30 and thus cures the sealant 30. The light-blocking area 82 blocks the ultraviolet light from irradiating the liquid crystal layer 20. At the same time, the part of ultraviolet light irradiating the liquid crystal displaying panel due to refraction of light occurred at the edge of the light-blocking area 82 is absorbed and blocked by the light-blocking layer 40, thus, the part of ultraviolet light is prevented from irradiating the liquid crystal layer 20. In this way, the defect of the liquid crystal displaying panel which is caused by the pre-reaction of the reactive monomers before the alignment of the liquid crystal displaying panel due to the irradiation of the ultraviolet light can be avoided.

In the above embodiments, the light-blocking layer 40 is preferably made of indium tin oxide (ITO). The light-blocking layer 40 made of ITO has a high absorptivity of ultraviolet light, which prevents the ultraviolet light from irradiating the liquid crystal layer 20 after a number of times of reflections and refractions, and further avoids the chemical pre-reaction of the reactive monomers in the liquid crystal layer 20.

In the embodiment, the light-blocking layer 40 and the pixel electrode layer 50 are formed in the same process, that is, the light-blocking layer 40 is simultaneously formed when the pixel electrode layer 50 is formed. A thickness of the light-blocking layer 40 is equal to that of the pixel electrode layer 50. Since the thickness of the light-blocking layer 40 is equal to that of the pixel electrode layer 50, the pixel electrode layer 50 and the light-blocking layer 40 can be formed in the same process, which simplifies the manufacturing process of the light-blocking layer and the needed equipment. In other embodiments, the light-blocking layer 40 can be formed after the pixel electrode layer 50, and the thickness of the light-blocking layer 40 is unequal to that of the pixel electrode layer 50.

In the embodiment, the light-blocking layer 40 is not connected to other components of the liquid crystal displaying panel, that is, the light-blocking layer 40 is electrically floating without generating any electrical signal. It is noted that in other embodiments, the light-blocking layer 40 can be electrically connected to the common electrode layer 60.

In the embodiment, an outer edge of the light-blocking layer 40 is aligned with an inner edge of the sealant-coating area 101 of the first substrate 10. An inner edge of the light-blocking layer 40 is kept close to the pixel electrode layer 50 but does not contact the pixel electrode layer 50. That is, on the premise of guaranteeing no electrical interference between the light-blocking layer 40 and the pixel electrode layer 50, the light-blocking layer 40 can be kept as close as possible to the pixel electrode layer 50. Since the distance between the light-blocking layer 40 and the pixel electrode layer 50 is kept smallest on the premise of guaranteeing no electrical interference between the light-blocking layer 40 and the pixel electrode layer 50, the area of the light-blocking area 40 can be largest to allow the light-blocking area 40 to block and absorb as much ultraviolet light irradiating the liquid crystal displaying panel as possible, which avoids the defect of the liquid crystal displaying panel caused by the irradiation of the liquid crystal layer 20 during the curing process of the sealant 30.

In the embodiment, corners of the outer edge of the light-blocking layer 40 are respectively rounded, and a fan-shaped notch is formed at an inner side of each corner of the light-blocking layer 40.

Figure 4:
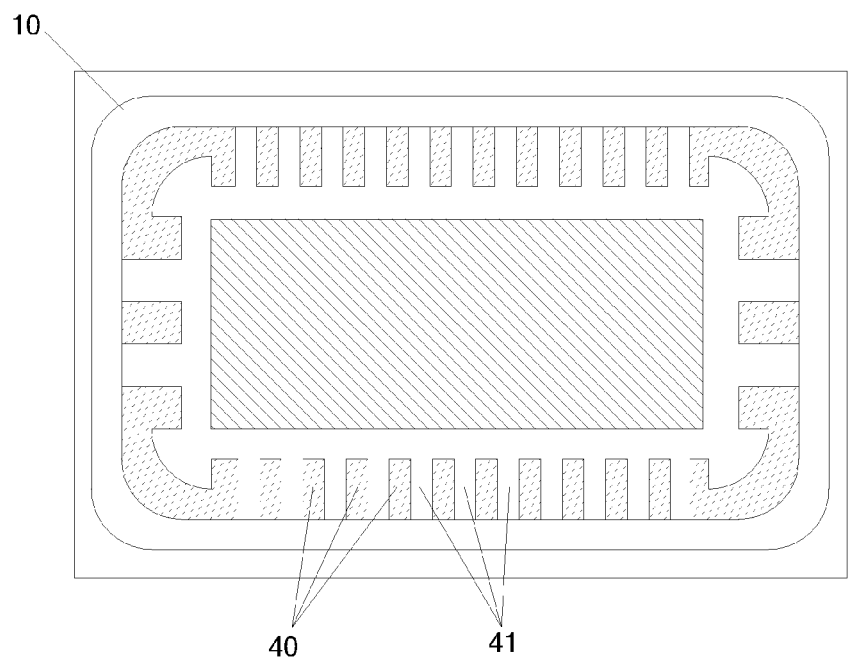
FIG. 4 is a schematic view of a first substrate of a liquid crystal displaying panel in accordance with a second embodiment of the present disclosure.

Referring to FIG. 4, which is a schematic view of a first substrate of a liquid crystal displaying panel in accordance with a second embodiment of the present disclosure. The difference between the first substrate 10 of the second embodiment and the first substrate 10 of the first embodiment lies that, a number of openings 41 are formed in the light-blocking layer 40 to allow for wiring of each circuit of the liquid crystal displaying panel, which simplifies the wiring of the liquid crystal displaying panel and improves the productivity of the liquid crystal displaying panel.

The present disclosure further provides a manufacturing method of the above light-blocking layer of the liquid crystal displaying panel.

Figure 5:
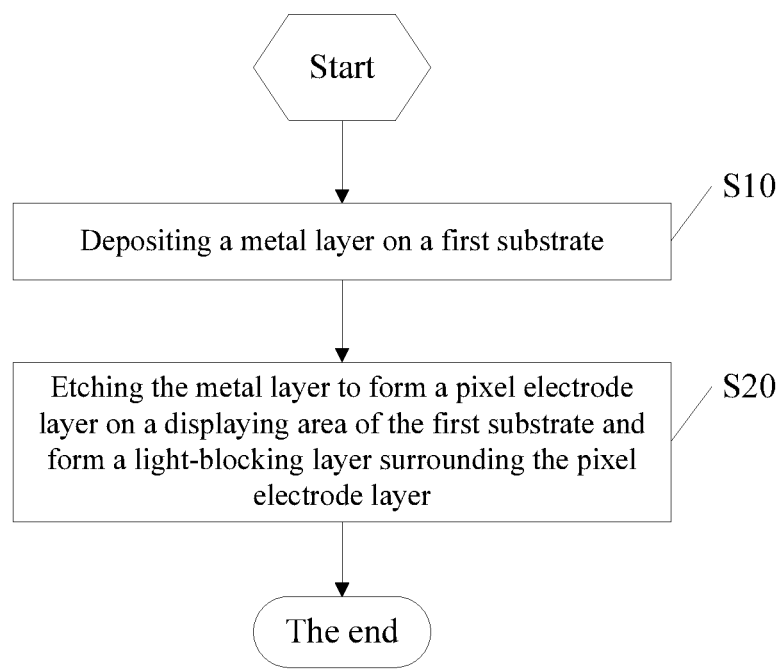
FIG. 5 is a flow chart of a manufacturing method of the light-blocking layer of the liquid crystal displaying panel.

Referring to FIG. 5, which is flow chart of a manufacturing method of the light-blocking layer of the liquid crystal displaying panel. In the embodiment, the manufacturing method of the light-blocking layer includes:

step S10, depositing a metal layer on a first substrate; and step S20, etching the metal layer to form a pixel electrode layer 50 on a displaying area of the first substrate and form a light-blocking layer 40 surrounding the pixel electrode layer 50.

The light-blocking layer 40 is not connected to other components of the liquid crystal displaying panel, that is, the light-blocking layer 40 is electrically floating and generates no electrical signals. It is noted that in other embodiments, the light-blocking layer 40 can be electrically connected to a common electrode layer 60.

An outer edge of the light-blocking layer 40 is aligned with an inner edge of the sealant-coating area 101 of the first substrate 10. An inner edge of the light-blocking layer 40 is kept close to the pixel electrode layer 50 but does not contact the pixel electrode layer 50. That is, on the premise of guaranteeing no electrical interference between the light-blocking layer 40 and the pixel electrode layer 50, the light-blocking layer 40 can be kept as close as possible to the pixel electrode layer 50. Since the distance between the light-blocking layer 40 and the pixel electrode layer 50 is kept smallest on the premise of guaranteeing no electrical interference between the light-blocking layer 40 and the pixel electrode layer 50, the area of the light-blocking area 40 can be largest to allow the light-blocking area 40 to block and absorb as much ultraviolet light irradiating the liquid crystal displaying panel as possible, which avoids the defect of the liquid crystal displaying panel caused by the irradiation of the liquid crystal layer 20 during the curing process of the sealant 30.

In the embodiment, corners of the outer edge of the light-blocking layer 40 are respectively rounded, and a fan-shaped notch is formed at an inner side of each corner of the light-blocking layer 40.

In other embodiments, a number of openings 41 are formed in the light-blocking layer 40 to allow for wiring of each circuit of the liquid crystal displaying panel, which simplifies the wiring of the liquid crystal displaying panel and improves the productivity of the liquid crystal displaying panel.

The light-blocking layer of the embodiment can absorb and block ultraviolet light to prevent the ultraviolet light from affecting the liquid crystal layer and causing displaying defect of the liquid crystal displaying panel. Additionally, the light-blocking layer and the pixel electrode layer are formed in the same process, that is, the light-blocking layer is simultaneously formed when the pixel electrode layer is formed. A thickness of the light-blocking layer is equal to that of the pixel electrode layer. Since the thickness of the light-blocking layer is equal to that of the pixel electrode layer, the pixel electrode layer and the light-blocking layer can be formed in the same process, which simplifies the manufacturing process of the light-blocking layer and the needed equipment.

It is noted that in other embodiments, the light-blocking layer can be formed after the pixel electrode layer is formed. That is, the light-blocking layer and the pixel electrode layer can be formed in different processes. Thus, light-blocking layers of difference thicknesses can be formed according to different requirements to allow for a flexible manufacture of the light-blocking layer.

The present disclosure further provides a manufacturing method of a liquid crystal displaying panel.

Figure 6:
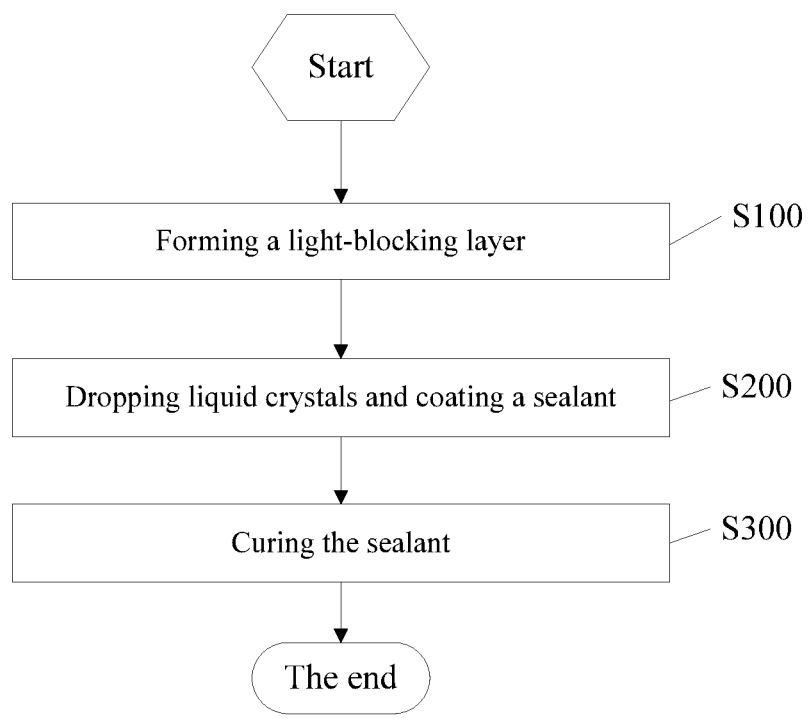
FIG. 6 is a flow chart of a manufacturing method of the liquid crystal displaying panel.

Referring to FIG. 6, which is a flow chart of a manufacturing method of the liquid crystal displaying panel. In the embodiment, the manufacturing method includes the following steps.

Step S100, forming a light-blocking layer.

In the embodiment, after a first substrate is provided, a metal layer is deposited on the first substrate and is further etched to from a pixel electrode layer 50 on a displaying area of the first substrate and a light-blocking layer 40 surrounding the pixel electrode layer 50. After that, a common electrode layer 60 is formed on a second substrate.

It is noted that in the embodiment, the pixel electrode layer can be formed at first before the light-blocking layer is formed. Since the pixel electrode layer and the light-blocking layer are formed in different processes, the light-blocking layers of difference thicknesses can be formed according to different requirements to allow for a flexible manufacture of the light-blocking layer.

Step S200, dropping liquid crystals and coating a sealant.

In the embodiment, the liquid crystals are dropped onto the displaying area of the first substrate 10 or the sealant is coated on a sealant-coating area 101 of the first substrate. Correspondingly, the sealant is also coated on the sealant-coating area 101 of the second substrate 70 or the liquid crystals are also dropped onto the displaying area of the second substrate 70.

Step S300, curing the sealant.

In the embodiment, after the first substrate 10 and the second substrate 70 are bonded together, the ultraviolet light passes through a photomask 80 to irradiate the sealant and cure the sealant, thereby sealing the liquid crystal layer between the first substrate 10 and the second substrate 70.

In the step S100, the light-blocking layer 40 is not connected to other components of the liquid crystal displaying panel, that is, the light-blocking layer 40 is electrically floating and generates no electrical signals. It is noted that in other embodiments, the light-blocking layer 40 can be electrically connected to the common electrode layer 60.

An outer edge of the light-blocking layer 40 is aligned with an inner edge of the sealant-coating area 101 of the first substrate 10. An inner edge of the light-blocking layer 40 is kept close to the pixel electrode layer 50 but does not contact the pixel electrode layer 50. That is, on the premise of guaranteeing no electrical interference between the light-blocking layer 40 and the pixel electrode layer 50, the light-blocking layer 40 can be kept as close as possible to the pixel electrode layer 50. Since the distance between the light-blocking layer 40 and the pixel electrode layer 50 is kept smallest on the premise of guaranteeing no electrical interference between the light-blocking layer 40 and the pixel electrode layer 50, the area of the light-blocking area 40 can be largest to allow the light-blocking area 40 to block and absorb as much ultraviolet light irradiating the liquid crystal displaying panel as possible, which avoids the defect of the liquid crystal displaying panel caused by the irradiation of the liquid crystal layer 20 during the curing process of the sealant 30.

In the embodiment, corners of the outer edge of the light-blocking layer 40 are respectively rounded, and a fan-shaped notch is formed at an inner side of each corner of the light-blocking layer 40.

In other embodiments, a number of openings 41 are formed in the light-blocking layer 40 to allow for the wiring of each circuit of the liquid crystal displaying panel, which simplifies the wiring of the liquid crystal displaying panel and improves the productivity of the liquid crystal displaying panel.

By forming the light-blocking layer surrounding the pixel electrode layer on the first substrate of the liquid crystal displaying panel, the ultraviolet light can be absorbed and prevented from irradiating the liquid crystal layer, which avoids the defect of the liquid crystal displaying panel caused by the irradiation of the liquid crystal layer during the curing process of the sealant.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A liquid crystal displaying panel, comprising:
   a first substrate having a displaying area and a sealant-coating area surrounding the displaying area; and
   a light-blocking layer arranged between the displaying area and the sealant-coating area;
   wherein the-first substrate further comprises a pixel electrode layer having a thickness equal to that of the light-blocking layer.

2. The liquid crystal displaying panel as claimed in claim 1, wherein an outer edge of the light-blocking layer is aligned with an inner edge of the sealant-coating area of the first substrate, and an inner edge of the light-blocking layer is kept close to the pixel electrode layer without contacting the pixel electrode layer.

3. The liquid crystal displaying panel as claimed in claim 1, wherein the light-blocking layer generates no electrical signals.

4. The liquid crystal displaying panel as claimed in claim 1 further comprising a second substrate, the second substrate comprises a common electrode layer electrically connected to the light-blocking layer.

5. The liquid crystal displaying panel as claimed in claim 4 further comprising a liquid crystal layer arranged between the first substrate and the second substrate, wherein the light-blocking layer is configured to prevent ultraviolet light from irradiating the liquid crystal layer.

6. The liquid crystal displaying panel as claimed in claim 1, wherein a fan-shaped notch is formed at an inner side of each corner of the light-blocking layer.

7. The liquid crystal displaying panel as claimed in claim 1, wherein a number of openings are formed in the light-blocking layer.

8. The liquid crystal displaying panel as claimed in claim 1, wherein the light-blocking layer is made of indium tin oxide for absorbing ultraviolet light.

9. A manufacturing method of a liquid crystal displaying panel, comprising:
   providing a first substrate which comprises a displaying area and a sealant-coating area surrounding the displaying area;
   forming a light-blocking layer between the displaying area and the sealant-coating area;
   depositing a metal layer on the first substrate; and
   etching the metal layer to form a pixel electrode layer on the displaying area of the first substrate and the light-blocking layer surrounding the pixel electrode layer, the pixel electrode layer having a thickness equal to that of the light-blocking layer.

10. The manufacturing method as claimed in claim 9, wherein an outer edge of the light-blocking layer is aligned with an inner edge of the sealant-coating area of the first substrate, and an inner edge of the light-blocking layer is kept close to the pixel electrode layer without contacting the pixel electrode layer.

11. The manufacturing method as claimed in claim 9, wherein the light-blocking layer is made of indium tin oxide for absorbing ultraviolet light.

12. The manufacturing method as claimed in claim 9, wherein the light-blocking layer generates no electrical signals.

13. The manufacturing method as claimed in claim 9 further comprising: providing a second substrate which comprises common electrode layer electrically connected to the light-blocking layer.

14. The manufacturing method as claimed in claim 9 further comprising: forming a fan-shaped notch at an inner side of each corner of the light-blocking layer.

15. The manufacturing method as claimed in claim 9 further comprising: forming a number of openings in the light-blocking layer.

* * * * *